Aug. 7, 1945.   L. W. FULLETON   2,381,584
WELDING HOLDER FOR METAL PIPES AND BARS AND THE LIKE
Filed April 10, 1943
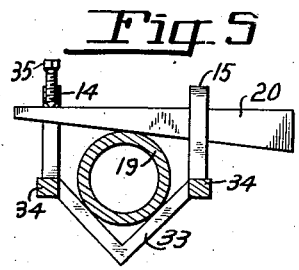
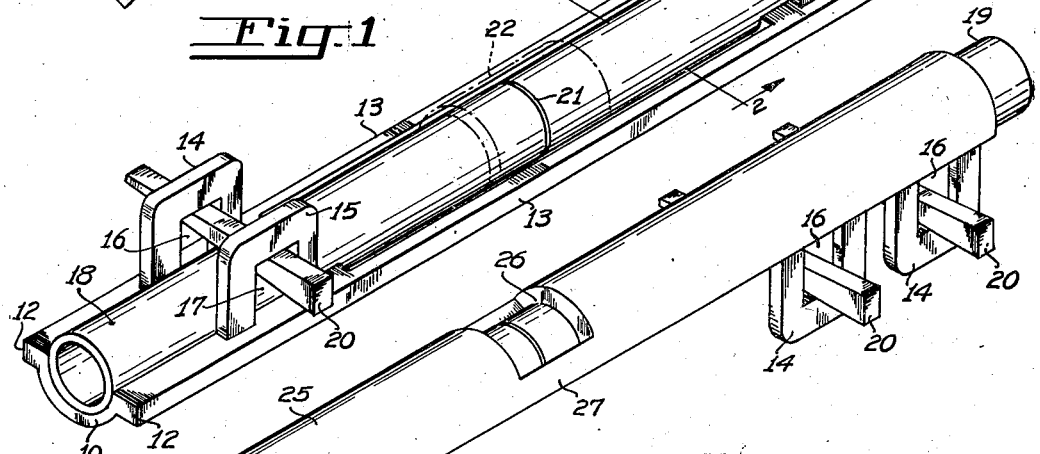
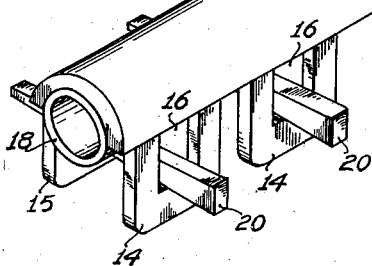
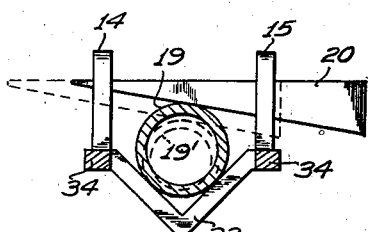
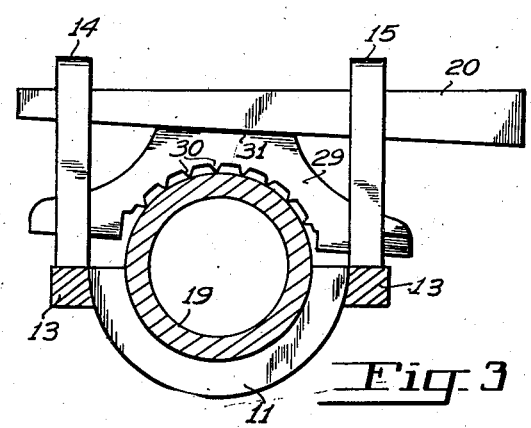
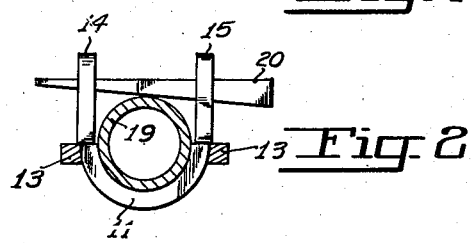
LEE W. FULLETON
INVENTOR
BY *Fuiler and Fuiler*
ATTORNEYS Patented Aug. 7, 1945

2,381,584

UNITED STATES PATENT OFFICE 2,381,584

WELDING HOLDER FOR METAL PIPES AND BARS AND THE LIKE

Lee W. Fulleton, Portland, Oreg.

Application April 10, 1943, Serial No. 482,660

2 Claims. (Cl. 113—102)

This invention relates to means for supporting the abutting ends of metal pipes or bars when it is desired to weld these ends together so as to form a continuous pipe or bar, and this invention relates, more specifically, to a means for securely holding the pipe or bar sections in axial alinement during the welding of their abutting ends.

The welding together of abutting ends of iron pipe sections, with such sections arranged in axial alinement, is a very frequent operation in ship building and in other industries, and various means and methods have been tried out for holding and supporting the abutting pipe ends in proper position with respect to each other during the welding operation. These means in general have not been entirely successful due largely to the fact that the pipe sections which are to be joined by welding are often long and heavy and it is a difficult matter to bring them into perfect axial alinement. Furthermore, even when the sections have been brought into the proper axial alinement, a slight jarring of one of the sections, especially if the section is long and the jarring occurs at the end remote from the end to be welded, will be sufficient to move that section slightly out of axial alinement. Such inadvertent jarring of one of the sections prior or during the welding is very apt to occur especially in crowded working conditions. If the welder notices that the pipe and sections are no longer in true alinement he must then hold up the welding until the sections have once again been properly alined, and this results in loss of time and inconvenience. If the welder does not happen to detect the fact that the sections are no longer in true alinement and proceeds with the welding, then there is even greater waste and loss of time since the welded pipe is then unsatisfactory.

One of the objects of this invention is to provide a welding holder particularly adapted for securing abutting ends of metal pipes, or metal bars, together in axial alinement with each other which will insure the maintenance of the proper alinement of the two sections as long as the holder is attached, and which will prevent inadvertent displacement or movement of one of the sections with respect to the other.

Another object of this invention is to provide such a holder which can quickly and easily be applied to the sections to be welded together, with a minimum of time and effort, and which can also be easily removed when the welding operation has been substantially completed.

Another object of this invention is to provide a holder for abutting pipe sections which can be easily adapted for use with pipes of different sizes or diameters.

A further object of this invention is to provide a holder which, while clamping the pipe sections firmly in position, will not prevent or interfere with the welding of the pipe ends together.

A still further object is to provide a welding holder which will meet the above requirements and objects but which will not be unduly heavy or cumbersome, and which will not be difficult or expensive to manufacture.

These and other objects I have been able to obtain by making my welding holder in such form that it will extend for a distance over the ends of the two sections to be welded, by providing adjustable clamping means on the holder for firmly securing each pipe section to the holder, by arranging for suitable spacing between the holder and the end portions of the pipe sections to be welded, and in general, by making my holder in the manner hereinafter to be briefly described.

In the following description reference is made to the accompanying drawing in which:

Fig. 1 is a perspective view of my welding holder showing two pipe sections secured therein preparatory to having their abutting ends welded together;

Fig. 2 is a section on line 2—2 of Fig. 1;

Fig. 3 is a similar section drawn to a larger scale but showing how a clamping dog may be used in the clamping of the pipe sections in the holder;

Fig. 4 is a sectional view similar to Figs. 2 and 3 but showing the bottom of the holder made V-shaped instead of semi-cylindrical, and also illustrating how different sizes of pipes can be clamped in the holder;

Fig. 5 is a sectional view of the same holder illustrated in Fig. 4 but showing the addition of a set screw in the top of one of the wedge holding ears of each pair to be used in conjunction with the wedge for clamping the pipe firmly in the holder; and Fig. 6 is an inverted perspective view of a modified form of my holder.

Referring first to Figs. 1 and 2, my holder, as shown in these figures, comprises an elongated semi-cylindrical body having a cut-out, rectangularly-shaped central portion leaving a pair of semi-cylindrical end members 10 and 11. A pair of diametrically opposite, longitudinally extending flanged edges 12 extend along the top of the holder. These flanged edges are narrowed at the cut-out portion so as to form integral parallel spaced bars 13 which will be slightly spaced from the surface of the pipe sections 18 and 19, as shown in Figs. 1 and 2.

Each of the end members 10 and 11 has a pair of parallel ears 14 and 15. The ears 14 and 15 have openings 16 and 17 respectively, and the ears of each pair are arranged with their openings 16 and 17 in transverse alinement and thus are adapted to have a clamping wedge 20 inserted therethrough.

When the two pipe sections which are to be welded together in axial alinement are placed in abutting relation with each section located in one of the end members 10 and 11 of the holder, wedges 20 are then driven in place between the transversely alined openings 16 and 17 of each pair of ears. As apparent, each wedge will act to clamp the corresponding pipe section firmly in place in the semi-cylindrical elongated groove of that end member.

When my welding holder is made in this form the internal diameter of the elongated semi-cylindrical groove should be approximately the same as the external diameter of the pipe. I have found that a single pair of ears with the wedge inserted in them is ordinarily sufficient to hold the pipe section firmly in the end member, although duplicate pair of ears could be provided on each end member if desired.

A very important feature of this welding holder is the fact that the integral parallel bars 13 into which the flanges are formed at the cut-out portion are spaced from the exterior surfaces of the pipe sections 18 and 19. This spacing of the connecting bars 13 from the pipe surfaces enables the welding to be completed entirely around the abutting pipe ends before the holder is removed. Also this spacing accommodates different types of welded joining. Thus the abutting pipe ends may be secured a slight distance apart, as indicated at 21 in Fig. 1, so as to leave a channel to be filled up the weld; or, when the pipe sections are being set in place, a sleeve (such as that indicated by the broken line 22 in Fig. 1) may be slid over the ends of the pipes and the welding then performed at the ends of the sleeve securing the corresponding pipe sections thereto. The spacing of the connecting bars 13 provides ample clearance for such a sleeve 22.

Instead of clamping the pipe sections in the end members with the holder by means of the wedges 20 alone, as shown in Figs. 1 and 2, a clamping dog 29 (see Fig. 3) may be used in conjunction with each wedge. The clamping dog 29 shown in Fig. 3, has a plurality of teeth 30 which engage the outer surfaces of the pipe to be clamped, and the dog 29 also has a flattened top edge 31 arranged to be engaged by the side of the wedge 20. Such a clamping dog enables a larger surface area of the pipe to be engaged by the clamp, and the stronger hold obtained on the pipe thereby may be desirable in some cases, particularly if the external diameter of the pipe should be somewhat less than that contemplated for use in the holder. Obviously clamping dogs and clamping means other than that illustrated could be substituted in my holder, but I consider the wedge clamp satisfactory and desirable particularly because of its simplicity and the speed and ease with which it can be set and released.

In the form in which I have shown my welding holder in Figs. 1 and 2 with the end members shaped so as to provide an elongated semi-cylindrical groove for each pipe section, the holder is necessarily restricted for use with pipes (or bars) having an external diameter approximately the same as the internal diameter of the grooves. In Fig. 4 however I show how my holder can be formed with a V-shaped groove in each end member in place of the semi-cylindrical groove. While the V-shaped groove does not afford a contact area as extensive as a semi-cylindrical groove (as will be apparent by comparison of Figs. 2 and 4), I have found that the V-shaped groove nevertheless will provide sufficiently strong hold and grip under ordinary conditions. Furthermore, the V-shaped groove has the advantage of accommodating pipes of different sizes. Thus in Fig. 4 I show how the holder in this form can be used with a pipe 19' of smaller diameter as well as with a larger diameter pipe 19. In all other respects the holder in this modified form is the same as that illustrated in Fig. 1. The two end members 33, having the V-shaped groove instead of the semi-cylindrical groove, are joined by the integral connecting portions of the flanges 34 corresponding to the bars 13 of Fig. 1, and which are similarly spaced sufficiently from the surfaces of the pipe ends to enable welding to be performed about the entire circumference without interference.

In Fig. 5 a set screw 35 is shown added to the ear 14 of each pair. Such a set screw enables the pressure of the wedge 20 against the pipe 19 to be increased, if desired, when the wedge is in place without driving the wedge any further through the ears. Ordinarily however the use of the wedge alone will be found sufficient.

While it is generally preferable when joining abutting pipe ends by means of welding, to complete the welding around the entire circumference of the joint during the initial welding operation, and while my holder, when made in the forms which I have described, enables this to be done without removing or even changing the position of the holder, nevertheless in some cases it may be desired, as a preliminary operation, merely to "tack" weld the abutting ends of the pipe sections and then complete the welding later when the holder has been removed. For such "tack" welding of pipe ends (or bars) the modified and simplified form of my holder which is shown (in inverted position) in Fig. 6 will suffice. My holder in this form comprises a single elongated semi-cylindrical body 25 provided with clamping ears 14 and 15 at each end and having a window or cut out portion 26 substantially at the center. The marginal body portions 27 which border the opposite sides of the window or cut out portion 26 are of sufficient size and strength to enable the holder to retain the necessary rigidity. Although these marginal portions 27 prevent any welding being done at those places so long as the holder remains in position, nevertheless the "tack" welding can be done in the window opening and on the opposite side. Any such "tack" welding will be sufficient ordinarily to hold the pipe sections securely together pending the subsequent completion of the joint. In Fig. 6 duplicate pairs of ears are shown at each end of the holder, but a single pair at each end would generally suffice. Similar duplicate pairs of wedge-holding ears could be substituted for the single pair of each of the end members of the holder of Fig. 1.

It is not my intention to restrict the end members in my holder to any particular size or shape, or to limit my invention to any special clamping means. Various modifications might easily be made in the forms of the holder which I have illustrated, without departing from the principle of my invention.

While I have described my holder in its different forms as being used in welding, and its most important use will be in this connection, nevertheless my holder can also serve to hold adjoining pipe ends, or rods, in axial alinement for any other purpose, either temporarily or permanently; and can be used in connection with temporary joining means between the adjoining pipe ends instead of the permanent welding.

I claim:

1. A welding holder of the character described for supporting a pair of pipes and the like in axial alinement during the welding operation, said holder comprising an elongated body having a longitudinal groove for accommodating said pipes, a pair of flanges extending outwardly along the top of said holder on opposite sides of said groove and lying in a plane parallel to the common axis of said pipes when said pipes are properly positioned, a cut-out section in the center of said elongated body extending from one flange to the other and causing said flanges at said cut-out section to be reduced to parallel bars spaced from the surface of the pipes, whereby to permit the welding to be performed entirely around the pipes at said cut-out section, a pair of ears near each end of said elongated body extending upwardly from the top of said body, the ears of each pair located on opposite sides of said groove respectively and in transverse alinement with each other, and a wedge member adapted to extend transversely through each pair of ears for clamping the pipes in position in the holder.

2. A welding holder of the character described for supporting a pair of pipes and the like in axial alinement during the welding operation, said holder comprising an elongated body having a longitudinal semi-cylindrical groove for accommodating said pipes, the diameter of said groove corresponding approximately to the diameter of the outside surface of said pipes, a pair of flanges extending outwardly along the top of said holder on opposite sides of said groove and lying in a plane parallel to the common axis of said pipes when said pipes are properly positioned, a rectangularly-shaped cut-out section in the center of said elongated body extending from one flange to the other and causing said flanges at said cut-out section to be reduced to parallel bars spaced from the surface of the pipes, whereby to permit the welding to be performed entirely around the pipes at said cut-out section, a pair of ears near each end of said elongated body extending upwardly from the top of said body, the ears of each pair located on opposite sides of said groove respectively and in transverse alinement with each other, and a wedge member adapted to extend transversely through each pair of ears for clamping the pipes in position in the holder.

LEE W. FULLETON.